Dec. 13, 1938.  W. F. EAMES  2,140,354
ELECTRICAL CONTROL SYSTEM
Filed Feb. 26, 1938
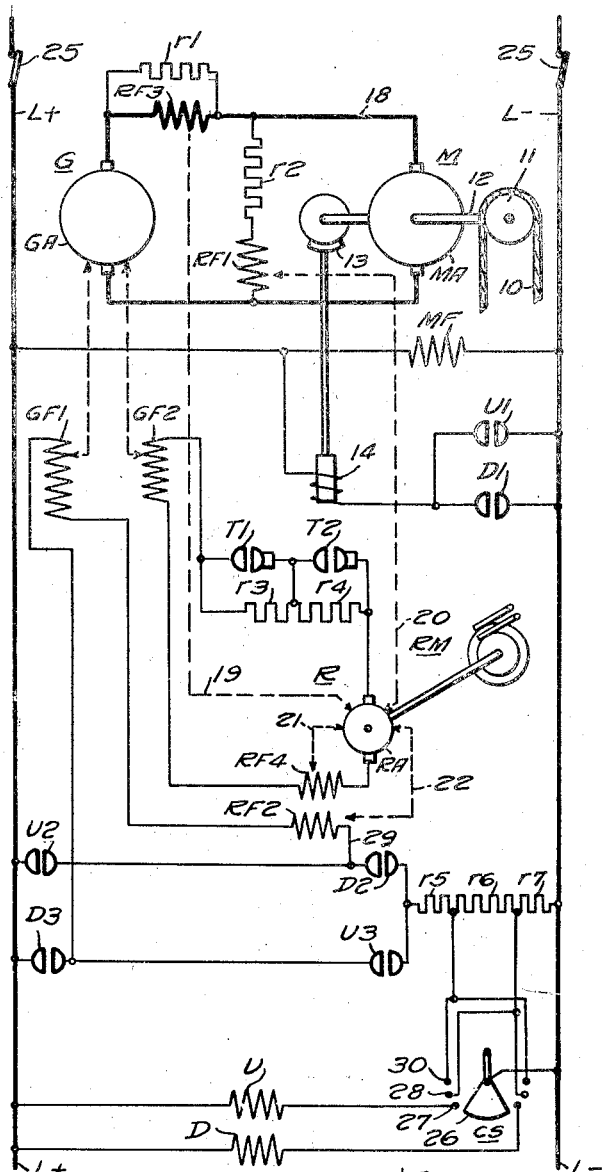
Fig. 1.
Fig. 3.
WITNESSES:
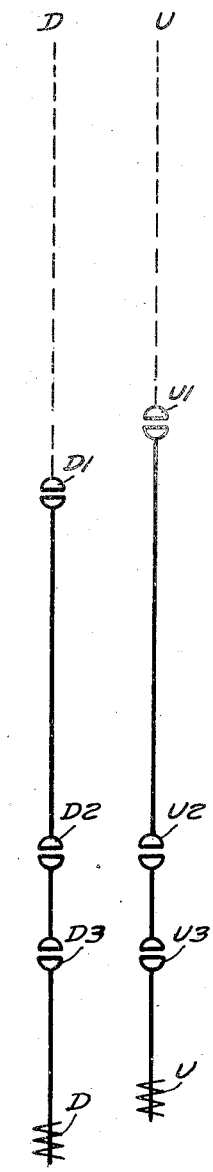
Fig. 2.
INVENTOR
William F. Eames.
BY
ATTORNEY Patented Dec. 13, 1938

2,140,354

UNITED STATES PATENT OFFICE 2,140,354

ELECTRICAL CONTROL SYSTEM

William F. Eames, Edgewood, Pa., assignor to Westinghouse Electric Elevator Company, Jersey City, N. J., a corporation of Illinois Application February 26, 1938, Serial No. 192,761

9 Claims. (Cl. 172—239)

My invention relates to motor control systems of the variable voltage or Ward-Leonard type, and more particularly to a novel form of speed regulating means for regulating the speed of the motors in such systems.

Where a Ward-Leonard variable voltage system of control is used for controlling a motor to be operated under wide ranges of operating conditions, it is usually difficult to secure an accurate relationship between the speed of the motor and the setting of the controller which is used to control it, because of many variables in conditions which may arise to affect the operation of the generator and the motor. For instance, changes in friction, load, temperature, resistance or operation of the brushes, etc., may affect the speed of the motor and cause it to fall either below or above the predetermined value at which it is desired to run it. This is particularly true of Ward-Leonard variable voltage systems for operating elevators or other apparatus where the load not only varies from time to time but frequently changes its direction of operation.

Hence it is an object of my invention to provide a regulating means for overcoming this difficulty which will automatically so regulate the speed of the motor as to hold it at a selected constant value regardless of any variations in the conditions under which the system operates.

Another object is to provide a control system for regulating the speed of the motor in a variable voltage system which shall not only be simple and inexpensive to install, operate and maintain in operation, but which shall reduce the complications usually necessary in the regulating circuits.

A further object is to provide a regulating means for a motor and generator in a variable voltage system in which the operation of the controller thereof will automatically so condition the regulating means that any variation in the selected speed of the motor will automatically cause the regulating means to so correct the energization of the generator that the speed of the motor will conform exactly to the speed for which the controller is set.

For a better understanding of the invention, reference may be had to the accompanying drawing, in which:

Figure 1 is a straight line diagrammatic representation of an elevator system embodying my improved system of control;

Fig. 2 is an explanatory representation of the connections between the up and the down relays and their contact members shown in Fig. 1; and, Fig. 3 is a diagrammatic representation of the field windings of the regulator under certain operating conditions.

Referring more particularly to the drawing, I have illustrated an elevator system for a car (not shown) supported by a cable 10 passing over a hoisting drum 11 mounted on a driving shaft 12 driven by a hoisting motor M. The hoisting motor M is provided with an armature MA and a field winding MF. The winding MF is connected across the supply conductors L+ and L— to give the motor a constant excitation while the system is in operation. An electromagnetic brake 13, controlled by a brake coil 14, is provided for controlling the car when the hoisting motor is de-energized.

A variable voltage system of control of the Ward-Leonard type is provided for the hoisting motor wherein its armature MA is connected in a closed circuit with the armature GA of a generator G having a separately excited main field winding GF1 and a correcting or regulating field winding GF2.

The separately excited main field winding GF1 of the generator should have sufficient ampere turns so that the maximum current through it will generate sufficient voltage on the generator armature to produce the maximum desired speed in the motor at no load.

The direction and speed of the hoisting motor M are controlled by controlling the direction and value of the excitation current supplied to the generator field winding GF1. The direction is controlled by an up direction switch U and a down direction switch D, while the value is controlled by a plurality of resistors r5, r6 and r7.

The operation of the up and down direction switches and the selection of the resistors to be included in, or excluded from, the generator field winding circuit is controlled by a switch CS which may be disposed in the car for actuation by the car attendant when he desires to start or stop the car.

Any suitable means may be provided for driving the armature GA of the generator G at a constant speed, and inasmuch as such driving means are old and well known in the art, none is shown in the drawing.

In the operation of a variable voltage system and particularly where it is used in connection with an elevator, there are many unlooked for variations in the conditions under which the generator and the motor operate which cause variations in the desired speed of the hoisting motor. For instance, there may be unlooked for changes in the friction of the driven parts, the resistance value of the windings, changes in load, changes in brush contact which vary the series excitation, etc. which may cause the speed of the motor to vary from the speed it should have in response to any selected setting of its controller. In order to overcome this difficulty, I have provided a regulating means for correcting the energization of the field of the generator so that the speed of the motor will be automatically held accurately at the desired value at all times.

The regulating means comprises a correcting field winding GF2 mounted in the generator and connected for energization by a regulator or regulating generator R having an armature RA and four field windings RF1, RF2, RF3 and RF4. The armature RA may be driven by any suitable driving motor RM which will operate it at a predetermined constant speed. It may be driven by the same motor that drives the generator G.

The field winding RF1 (called first field winding) is a voltage responsive winding connected across the loop circuit 18 to measure the terminal voltage of the hoisting motor. It should be so designed that the maximum current flowing in its windings will not cause it to overheat. The dotted line 20 indicates the association of the winding RF1 with the regulator R. In order to reduce the effect of changes in resistance due to the temperature rise of the winding RF1 caused by the current flowing therethrough, it is connected in series circuit relation with a resistor $r2$ whose value does not change with temperature, so that a predetermined part of the voltage drop is consumed in the resistor, leaving the remainder to be consumed in the winding RF1.

The field winding RF3 (called third field winding) is a current responsive winding that is connected in series in the loop circuit 18. The dotted line 19 indicates the association of the winding RF3 with the armature RA. The proportion of the current flowing through the winding RF3 may be adjusted by means of a shunt resistor $r1$. The winding RF3 measures the current flowing in the loop circuit and should have a value such that, when the motor is carrying a motoring load, the ampere turns of the winding RF3 will oppose those of the winding RF1, so that the combined ampere turns are proportional to the counter-electromotive force or the speed of the motor. Consequently, assuming an increase in the load on the motor, the current through it will increase and the IR drop in the motor will increase, thereby increasing the ampere turns of the winding RF3; and assuming the terminal voltage of the motor is constant, then, increasing the load will decrease the speed and the increased current corresponding to the increased load acting through the field winding RF3 will oppose some of the ampere turns generated by the constant field RF1 so that the combined ampere turns are proportional to the reduced speed of the motor. Hence it is seen that the combined effect of the field windings RF3 and RF1 is to provide ampere turns for the regulating generator in proportion with the speed of the motor M.

The field winding RF2 (called second field winding) is connected in series with the main field winding GF1 of the generator. Hence, the value and the direction of its energization will be controlled by the operation of the car switch CS and in accordance with the direction and value of energization of the main field winding GF1. The dotted line 22 indicates the association of the winding RF2 with the regulator R. Inasmuch as the direction of energization and the amount of energization of the winding RF2 may be controlled by the car switch CS, that winding may be called the pilot field winding of the regulator. Inasmuch as the field winding RF2 is excited by the current that supplies the main generator field, its excitation is roughly proportional to the voltage output of that generator and it is also roughly proportional to the voltage across the field winding RF1, also it is in some degree proportional to the speed of the motor. Under certain normal operating conditions, it will be found that no current is flowing in the loop circuit 18, because the load drives the elevator motor just sufficiently to overcome its loses. Under these conditions the winding RF2 opposes the winding RF1 and should be just equal to it at some relatively low speed, say 1/4 full motor speed.

The field winding RF4 (called fourth field winding) is a self-exciting winding that is connected in series with the armature RA of the regulator and also in series with the regulating or correcting field winding GF2 of the generator G. The winding RF4 when considered independently of the other field windings of the regulator should be adjusted to a value that will produce a voltage on the regulator armature just sufficient to send through the armature circuit the current needed to generate the previously mentioned voltage.

The diagram in Fig. 3 indicates the relationship of the ampere turns of the various field windings of the regulator when the hoisting motor is carrying a motor load, but it will be apparent that the relationship of the ampere turns will vary when the operation of the system varies.

The generator correcting field GF2 should be of such value that the maximum voltage of the self-excited circuit will produce sufficient corrective ampere turns and, therefore, generator voltage to bring the motor speed to the desired value and thereby correct for the maximum variations that are likely to occur in normal service.

Inasmuch as the temperature of the generator will affect the impedance of the correcting field winding GF2, impedance devices such as a resistor $r3$ and a resistor $r4$ are connected in the circuit of the winding GF2 and thermostatic means such as a pair of thermostats T1 and T2 are associated with the winding for including the resistors in or excluding them from its circuit in accordance with its temperature. The thermostat T1 may be designed with such characteristics as to close its contact members at say 42° C. and the thermostat T2 may be designed with such characteristics as to close its contact members at say 59° C. Hence as the temperature of the correcting field goes up and causes its resistance to increase, the thermostats short out enough resistance to compensate for the rise in temperature and thereby maintain the resistance of the self excited circuit relatively constant.

An assumed operation of the system is as follows:

Assuming that the switches 25 are closed to connect the control system represented by the supply conductors L+ and L— to a suitable source of supply of electric energy and that the attendant moves the car switch CS in a clockwise direction to cause the car to move upwardly, this movement causes contact member 26 to engage the contact member 27, thereby energizing the up direction switch U by a circuit extending through L+, U, 27, 26 to L—.

The energized up direction switch closes its contact members U1, U2 and U3. The closing of the contact members U1 energizes the brake coil 14 to release the brake 13, thereby permitting operation of the elevator car. The circuit for the coil extends through L+, 14, U1, L—.

The closing of the contact members U2 and U3 energizes the main field winding GF1 of the generator and the pilot field winding RF2 of the regulator for operation in the up direction by the following circuit:

L+, U2, 29, RF2, GF1, U3, r5, r6, r7, L—.

Inasmuch as the generator armature GA is being operated at a constant speed, the energization of its field winding GF1 causes the armature GA to supply the loop circuit 18 and consequently the armature MA of the hoisting motor with energy to start it in operation. The energized motor starts the car upwardly. It will be observed that the resistors r5, r6 and r7 limit the current through the field winding GF1 to the value for which these resistors are adjusted.

Assuming now that the car attendant desires to operate the car at a higher speed, he continues the movement of the car switch CS to engage the contact members 26 and 28, thereby short circuiting the resistor r7 in the circuit for the pilot field winding RF2 and the main generator field winding GF1. This causes these windings to be supplied with a greater value of current. The increased energization of the field winding GF1 causes its armature GA to supply the loop circuit 18 with an increased amount of energy, and, consequently the armature MA of the hoisting motor, to cause it to rotate at an increased speed. Hence, the car now accelerates to its intermediate speed as it moves upwardly.

The increased energization of the pilot winding RF2 of the regulator also tends to balance the increased effect of the current in the regulator field winding RF3 and the voltage in the regulator field winding RF1, thus maintaining the regulator in proper relation to the increased output of the generator G and the increased speed of the motor M.

It will be assumed now that the car attendant throws the car switch CS to its "full on" position thereby connecting the contact members 26 and 30 to short circuit the resistor r6, as well as the resistor r7 in the circuit for the pilot field winding RF2 and the generator field winding GF1. The increased energization of the field winding GF1 causes the armature GA to supply the loop circuit 18 with an increased value of energy, and consequently, causes the motor M to increase its speed to its normal high running speed. At the same time, the increased energization of the regulator field winding RF2 causes it to balance the effect of the current responsive field winding RF3 and the voltage responsive field winding RF1 of the regulator, so that the regulator will remain balanced in relation to the energy supplied by the generator to the hoisting motor, and in accordance with the speed of the motor, as long as the speed of the motor remains at its predetermined value. It may be noted that in actual practice, the car attendant usually throws the car switch "full on" in starting, without hesitating on the various contact members. The detailed step-by-step movement here given has been cited to shown how each step comes in as the car switch is moved to its full on position.

As the generator G built up to its normal voltage, its temperature increased, thereby increasing the resistance of its correcting field winding GF2. As the temperature increased from room temperature up to, say 42° C., the thermostat T1 was energized to close its contact members, thereby shorting out the resistor r3 in circuit with the winding GF2. As the temperature increased still further to, say 59° C., the thermostat T2 was energized to close its contact members, thereby shorting out the resistor r4 in the circuit of the correcting field winding GF2, so that the resistance of the circuit for the correcting field winding GF2 will remain approximately constant, regardless of the temperature of the generator.

As long as the hoisting motor M remains at its normal high running speed, the field windings RF1, RF2, RF3 and RF4 of the regulator R will so balance each other that the output of the regulator armature RA to the regulating field winding GF2 will remain approximately zero and hence, will not affect the energization of the generator G. However, if the speed of the hoisting motor increases above its normal high running speed, the current responsive field winding RF3 and the voltage responsive field winding RF1 of the regulator R will be so affected that their combined ampere turns will overbalance the ampere turns of the pilot field winding RF4, thus causing the regulator armature RA to supply energy to the regulating field winding GR2 in a direction reversed to the energization of the field winding GF1. This decreases the effect of the generator field winding GF1 and consequently, lowers the output of the armature GA to the loop circuit 18, which decreases the speed of the motor M until it moves down to its normal high speed. Hence, it is seen that the regulator will respond to overspeeding of the hoisting motor M and correct the energization of the generator until the hoisting motor returns to normal operation.

On the other hand, if the speed of the hoisting motor M decreases below its normal high running speed, the current in the regulating field winding RF3 will be decreased and the voltage in the winding RF1 will be decreased so that the combined ampere turns of these two windings will be less than the ampere turns of the pilot winding RF2, thereby causing the energy in the regulating armature RA to change its direction, thus energizing the regulating field winding GF2 in a direction corresponding to the direction of the energy in the generator field winding GF1 to aid that winding in increasing the energization of the generator. The increased energization of the generator winding causes the generator armature GA to increase the energy it is supplying to the loop circuit 18, thereby causing the hoisting motor M to increase its speed until it reaches its normal high running speed. Hence, it is seen that a decrease in the speed of the hoisting motor M will cause the regulator to increase the energization of the generator to bring the speed of the hoisting motor up to its normal predetermined value.

The conditions existing in the system after the motor speed has increased to the desired normal high speed again will be that the generator field GF1 and regulator field RF2 wil be excited with the same current as under the normal conditions, combined field RF3 and RF1 will be excited as under the normal conditions also as the speed of the motor M is now the same as it was originally and the excitation of these fields is proportional to the speed. As the combined effect of RF3 and RF1 equals and opposes RF2 the net effect on armature RA is zero. Field RF4 now, however, has a current flowing through it that it just self maintaining in its effect on armature RA and this current also flows through correcting field GF2. The generator now has additional excitation just sufficient to overcome the disturbance that caused the motor speed to fall, and the original speed is maintained in motor M.

From the foregoing, it will be obvious that the regulator will automatically regulate the speed of the hoisting motor to maintain it at its normal high running speed. It will also be obvious that inasmuch as the pilot field winding RF4 is energized by the operation of the car switch in accordance with the energization of the generator field, the regulator will function not only when the motor is to be operated at its normal high speed, but also when the motor is to be operated at its intermediate speed or at any other speed for which the car switch may be adjusted.

Assuming now that the car attendant desires to bring the car to a stop, he centers the car switch, thus first disconnecting the contact members 26 and 30 to re-insert the resistor r8 in the circuit for the generator field winding GF1 and next opening the contact members 26 and 28, thereby inserting the resistor r7 in the circuit of the generator field winding GF1, and finally opening the contact members 26 and 27 to deenergize the up direction switch U. The deenergization of the up direction switch U opens its contact members U2 and U3, thereby deenergizing the generator field winding GF1 to stop the hoisting motor M, and opens its contact members U1 to deenergize the brake coil 14, thus applying the brake to stop and hold the car at the landing at which the attendant desires to make a stop.

By reason of the foregoing description, it will be understood that I have illustrated and described a simple and effective regulating system for a Ward-Leonard variable voltage system in such manner as to insure the operation of the car at the desired predetermined speeds upon setting or moving the car switch or controller to a position corresponding to the desired predetermined speed.

Although I have illustrated and described only one specific embodiment of my invention, it is to be understood that changes therein and modifications thereof may be made without departing from the spirit and scope of the invention.

I claim as my invention:

1. In a Ward-Leonard control system having a generator provided with an armature and a first field winding and a second field winding, and a motor connected in a loop circuit with said generator armature; the combination of a first means responsive to the electromotive force of said generator for producing a magnetomotive force proportional to said electromotive force; a second means for producing a magnetomotive force proportional to said first field winding, a third means for producing a magnetomotive force proportional to the current in said generator armature; means differentially responsive to the magnetomotive force of said first means and the magnetomotive forces of said second and third means for applying an excitation to said second field winding, and a fourth means responsive to the current flowing in said second field winding for altering the magnetomotive forces acting on said differentially responsive means.

2. In a Ward-Leonard control system having a generator provided with an armature, a main field winding and a correcting field winding, and a motor connected in a loop circuit with said generator armature, the combination with a regulating means comprising a first field winding responsive to the electromotive force of said generator for producing a magnetomotive force proportional to said electromotive force; a second field winding for producing a magnetomotive force proportional to said main field winding, a third field winding for producing a magnetomotive force proportional to the current in said generator armature; a regulator armature responsive to the algebraic sum of the magnetomotive forces of said first, second and third field windings for applying excitation to said correcting field winding, and a fourth field winding responsive to the current flowing in said correcting field winding for altering the magnetomotive forces acting on said differentially responsive means.

3. In a Ward-Leonard control system having a generator provided with an armature, a main field winding and a correcting field winding, and a motor connected in a loop circuit with said generator armature, the combination with a regulator comprising a voltage-responsive field winding connected across the terminals of the generator armature for producing a magnetomotive force proportional to the electromotive force of said armature, a pilot field winding connected in series with the main field winding for producing a magnetomotive force proportional to the electromotive force of said main field winding, a current-responsive field winding connected in series with the generator armature in said local circuit for producing a magnetomotive force proportional to the current in said generator armature; an armature differentially responsive to the magnetomotive force of said voltage responsive field winding and the magnetomotive forces of said pilot and current-responsive field windings and having its terminals connected to said correcting field winding for applying a correcting excitation thereto, and an additional field winding connected in series with the correcting field winding and responsive to the current flowing therein for altering the magnetomotive forces acting on said differentially responsive armature.

4. In a Ward-Leonard control system having a generator provided with an armature, a main field winding and a correcting field winding, and a motor connected in a loop circuit with said generator armature, the combination with a regulator comprising a voltage-responsive field winding connected across the terminals of the generator armature for producing a magnetomotive force proportional to the electromotive force of said armature, a pilot field winding connected in series with the main field winding for producing a magnetomotive force proportional to the electromotive force of said main field winding, a current-responsive field winding connected in series with the generator armature in said loop circuit for producing a magnetomotive force proportional to the current in said generator armature; an armature differentially responsive to the magnetomotive force of said voltage-responsive field winding and the magnetomotive forces of said pilot and current-responsive field windings and having its terminals connected to said correcting field winding for applying a correcting excitation thereto, and an additional field winding connected in series with the correcting field winding and responsive to the current flowing therein for altering the magnetomotive forces acting on said differentially responsive armature, a controller for connecting the main field winding and the pilot field winding to a source of electric energy and a resistor responsive to operation of the controller for varying the amount of excitation of the pilot field winding and the main field winding for causing the motor to be operated at selected predetermined speeds and the regulator to be adjusted to regulate the system for the predetermined speed for which the controller is set.

5. A regulator for an electrical system, comprising a series circuit and means for initiating a correcting current in said circuit, said circuit including an armature, a series field winding for exciting the armature, and an output field winding in series relation with each other, in which the volts per ampere of the series field winding equals the amperes per volt flowing in the circuit, whereby a correcting current may be maintained in the output field winding independent of the forces required to initiate the correcting current.

6. A series circuit including an armature, a field winding for exciting the armature and an output winding in series relation with each other, an impedance device associated with the circuit, and thermostatic means for controlling the impedance device, said thermostatic means being responsive to the temperature of the output winding for excluding said impedance device from the series circuit to thereby correct for changes in the impedance in the output winding.

7. In an electrical system, a series circuit including an armature, a field winding for exciting the armature, and an output winding, in series relation with each other, in which the volts per ampere of the series field winding equals the amperes per volt flowing in the circuit, an impedance device associated with the circuit, and a thermostatic means for controlling the impedance device, said thermostatic means being responsive to the temperature of the output winding for excluding said impedance device from the series circuit to thereby correct for changes in the impedance in the output winding.

8. In a Ward-Leonard control system, a motor connected to a load device, a main generator for energizing the motor, said generator having a main field winding and a correcting field winding, and an auxiliary generator for supplying a correcting flow of energy for said correcting field winding, said auxiliary generator having an armature connected in series circuit with the correcting field winding, a field winding connected in the series circuit with said armature, a current responsive field winding, a voltage responsive field winding, and a pilot field winding, said current responsive winding being disposed to be responsive to the current flow from said generator to said motor, said voltage responsive winding being disposed to be responsive to the voltage applied to the motor by the main generator, and said pilot winding being connected in series circuit relation with said main field winding, an impedance device associated with the circuit to the correcting field winding, and a thermostatic means responsive to the temperature of the correcting field winding for excluding the impedance device from said circuit at a predetermined temperature of said correcting field winding to correct the circuit changes in the impedance of the correcting field winding caused by changes of temperature of that field winding.

9. In a Ward-Leonard control system, a motor connected to a load device, a main generator for energizing the motor, said generator having a main field winding and a correcting field winding, an auxiliary generator for supplying a correcting flow of energy for said correcting field winding, said auxiliary generator having an armature connected to the correcting field winding, a self-exciting field winding connected by a series circuit with said armature to cause the volts per ampere of the series field winding to equal the amperes per volt flowing in the series circuit, a current responsive field winding, a voltage responsive field winding, and a pilot field winding, said current responsive winding being disposed to be responsive to the current flow from said generator to said motor, said voltage responsive winding being disposed to be responsive to the voltage applied to the motor by the main generator, and said pilot winding being connected in series circuit relation with said main field winding.

WILLIAM F. EAMES.